United States Patent
Masahiro

(10) Patent No.: US 10,845,612 B2
(45) Date of Patent: Nov. 24, 2020

(54) CAMERA MODULE AND ELECTRONIC DEVICE INCLUDING SAME

(71) Applicant: Samsung Electronics Co., Ltd., Suwon-si (KR)

(72) Inventor: Shirono Masahiro, Yokohamashi (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 16/061,098

(22) PCT Filed: Dec. 9, 2016

(86) PCT No.: PCT/KR2016/014438
§ 371 (c)(1),
(2) Date: Jun. 11, 2018

(87) PCT Pub. No.: WO2017/111363
PCT Pub. Date: Jun. 29, 2017

(65) Prior Publication Data
US 2018/0364494 A1    Dec. 20, 2018

(30) Foreign Application Priority Data

Dec. 25, 2015  (JP) ................................ 2015-254078
Oct. 18, 2016  (KR) ........................ 10-2016-0135260

(51) Int. Cl.
*G02B 26/08* (2006.01)
*G02B 27/64* (2006.01)
(Continued)

(52) U.S. Cl.
CPC ............ *G02B 27/646* (2013.01); *H04M 1/02* (2013.01); *H04M 1/0264* (2013.01);
(Continued)

(58) Field of Classification Search
CPC ............ G02B 7/34; G02B 7/28; G02B 26/08
(Continued)

(56) References Cited

U.S. PATENT DOCUMENTS 6,741,809 B1  5/2004  Chang
7,345,833 B2  3/2008  Hwang
(Continued)

FOREIGN PATENT DOCUMENTS

CN       1610382 A       4/2005
CN       201335933 Y    10/2009
(Continued)

OTHER PUBLICATIONS

ISA/KR, "International Search Report and Written Opinion of the International Searching Authority," International Application No. PCT/2016/014438, dated Mar. 14, 2017, 24 pages.
(Continued)

*Primary Examiner* — Clayton E. LaBelle
*Assistant Examiner* — Fang-Chi Chang

(57) ABSTRACT

Provided is a camera module capable of selectively capturing an image in a first photographing direction or in a second photographing direction opposite to the first photographing direction. The camera module includes: a reflection part that is movable between a first location, at which light incident from a side located in the first photographing direction is reflected in a direction perpendicular to the first photographing direction, and a second location, at which light incident from a side located in the second photographing direction is reflected in a direction perpendicular to the first photographing direction; and a light reception part configured to capture an image by converting the light, which has been reflected by the reflection part, into an electrical signal, wherein,
(Continued)

during the movement of the reflection part, the thickness of the reflection part can be constantly maintained in the first photographing direction.

12 Claims, 15 Drawing Sheets

(51) Int. Cl.
*H04M 1/02* (2006.01)
*H04N 5/225* (2006.01)
*H04N 5/232* (2006.01)

(52) U.S. Cl.
CPC ......... *H04N 5/2253* (2013.01); *H04N 5/2254* (2013.01); *H04N 5/2259* (2013.01); *H04N 5/23287* (2013.01); *H04M 2250/52* (2013.01); *H04N 2201/0084* (2013.01)

(58) Field of Classification Search
USPC ........................................ 396/112; 359/211.3
See application file for complete search history.

(56) References Cited

U.S. PATENT DOCUMENTS

| | | | |
|---|---|---|---|
| 7,375,759 B2 | 5/2008 | Lin | |
| 9,338,357 B2 | 5/2016 | Nomura et al. | |
| 9,635,264 B2 | 4/2017 | Nomura et al. | |
| 2003/0036365 A1* | 2/2003 | Kuroda | H04N 5/2254 455/575.1 |
| 2015/0362706 A1 | 12/2015 | Chujo et al. | |
| 2016/0026067 A1* | 1/2016 | Feinbloom | G03B 17/565 396/544 |

FOREIGN PATENT DOCUMENTS

| | | |
|---|---|---|
| CN | 103118498 A | 5/2013 |
| CN | 204439983 U | 7/2015 |
| JP | H114370 A | 1/1999 |
| JP | 2004-260413 A | 9/2004 |
| JP | 2005-017569 A | 1/2005 |
| JP | 2005-110196 A | 4/2005 |
| JP | 2005-221822 A | 8/2005 |
| JP | 2006-106281 A | 4/2006 |
| JP | 2007-116361 A | 5/2007 |
| JP | 2014-164216 A | 9/2014 |
| KR | 10-2005-0106913 A | 11/2005 |
| KR | 10-0704982 B1 | 4/2007 |
| KR | 10-2012-0080443 A | 7/2012 |
| KR | 10-2015-0091010 A | 8/2015 |

OTHER PUBLICATIONS

Office Action dated Feb. 25, 2020 in connection with Chinese Patent Application No. 201680076149.5, 16 pages.

* cited by examiner

CAMERA MODULE AND ELECTRONIC DEVICE INCLUDING SAME

CROSS-REFERENCE TO RELATED APPLICATIONS AND CLAIM OF PRIORITY

This application is a 371 National Stage of International Application No. PCT/KR2016/014438 filed Dec. 9, 2016, which claims priority to Japanese Patent Application No. JP 2015-254078, filed on Dec. 25, 2015 and Korean Patent Application No. KR 10-2016-0135260, filed on Oct. 18, 2016, the disclosures of which are herein incorporated by reference in their entirety.

BACKGROUND

1. Field

The present disclosure relates to a camera module and an electronic device including the same, and more particularly, to a camera module with a slim shape_and an electronic device including the camera module.

2. Description of Related Art

Recently, electronic devices having a camera module mounted thereon, for example, portable communication terminal equipment, having a function of photographing a landscape or person and a self-timer photographing function (hereinafter, referred to as "selfie photographing" allowing a photographer to photograph himself or herself, have become popularized. Since general photographing and selfie photographing are different in terms of photographing directions, bi-directional photographing is realized using various elements.

Meanwhile, in the era of compact digital cameras before the widespread use of smartphones, there was a demand for selfie photographing with an equivalent image quality performance to that of main photographing, which was performed while observing a liquid crystal monitor screen placed on a rear surface of a camera. Techniques disclosed in Patent documents 1 to 3 have been suggested as methods corresponding to such demand.

Patent document 1 discloses an apparatus, whereby, in order to commonly use an imaging unit when performing main photographing and selfie photographing, an incident-light reflection unit is rotated around an incidence optical axis reflected by the incident-light reflection unit, i.e., a reflection optical axis, so that main photographing and selfie photographing can be performed using the imaging unit.

Also, Patent document 2 discloses an apparatus, whereby, in order to commonly use an imaging unit when performing main photographing and selfie photographing, an incident-light reflection unit is rotated in such a way that a reflection surface of the incident-light reflection unit is rotated in a vertical direction of a photographing screen, so that main photographing and selfie photographing can be performed using the imaging unit.

Furthermore, Patent document 3 discloses an apparatus, whereby, in order to commonly use an imaging unit when performing main photographing and selfie photographing, the whole of a camera module placed inside a case of a product main body is rotated so that main photographing and selfie photographing can be performed using the imaging unit.

As described above, compact digital cameras capable of performing general photographing and selfie photographing have been suggested.

PRIOR-ART DOCUMENT

Patent Document

[Patent document 1] Japanese Patent Laid-open Publication No. 1999-4370
[Patent document 2] Japanese Patent Laid-open Publication No. 2005-221822
[Patent document 3] U.S. Pat. No. 7,345,833

SUMMARY

However, if the configuration of Patent document 1 is applied to a case of a smartphone having a tapered thickness, a configuration in which an optical unit is accommodated in a thin case can be assumed. FIGS. 1A, 1B, and 1C are schematic views illustrating one example in which an optical unit 10 is accommodated in a thin case 11. In this configuration, a maximum rotation radius exceeds the thickness of a camera module (or a smartphone) while the optical unit 10 is rotated, as illustrated in FIGS. 1A, 1B, and 1C.

Also, even when the configuration of Patent document 2 is applied to a case of a smartphone having a tapered thickness, a camera module is thicker than a main body of a photographing apparatus while a mirror is rotated, as illustrated in FIG. 4 of Patent document 2, and thus, a mirror part is thicker than the main body of the photographing apparatus.

Further, in Patent document 3, since the whole of a camera module including all portions of a photographing optical system is rotated inside a case of a smartphone, the entire length of the optical system is increased compared to the thickness of the case of the smartphone.

In this way, it is difficult to embed elements for realizing bi-directional photographing including general photographing of photographing an image of a landscape, or the like and selfie photographing using one imaging unit in an electronic device with a slim shape.

According to an aspect of the present disclosure, a camera module capable of selectively capturing an image in a first photographing direction or in a second photographing direction opposite to the first photographing direction, includes a reflection unit that is movable between a first location, at which light incident from a side located in the first photographing direction is reflected in a direction perpendicular to the first photographing direction, and a second location, at which light incident from a side located in the second photographing direction is reflected in a direction perpendicular to the first photographing direction, and a light-receiving unit configured to capture an image by converting the light, which has been reflected by the reflection unit, into an electrical signal, wherein, during the movement of the reflection unit, a thickness of the reflection unit is constantly maintained in the first photographing direction of the reflection unit.

The reflection unit may be rotated around a rotation axis that is parallel to the first photographing direction and may be moved.

The reflection unit may be rotated around the rotation axis that is a photographing direction approximately perpendicular to a direction of the light-receiving unit so that light incident from a side located in one direction of the first photographing direction and the second photographing direction opposite to the first photographing direction is selected and is reflected in the direction of the light-receiving unit. Thus, a shape caused by rotation of the reflection unit is changed in a direction of a main surface of the camera module so that there is no shape change in a thickness direction of the camera module, and elements by which bi-directional photographing, which includes general photographing of scenery or the like, and selfie photographing, is realized using one imaging unit, may be embedded in an electronic device with a slim shape.

The reflection unit may be a complex prism in which reflection surfaces of two prisms face each other. An optical distance may be increased by a prism having a higher refractive index than that of air, and an optical path having a predetermined length may be obtained.

The reflection unit may include a first prism including a first incidence surface facing in the first photographing direction, a first exit surface facing in a direction perpendicular to the first photographing direction, and a first reflection surface on which light incident through the first incidence surface is reflected facing toward the first exit surface, and a second prism including a second incidence surface facing in the second photographing direction, a second exit surface facing in a direction perpendicular to the second photographing direction, and a second reflection surface on which light incident through the second incidence surface is reflected facing toward the second exit surface.

The first reflection surface and the second reflection surface may be in contact with each other, the first incidence surface and the second incidence surface may be placed to face in opposite directions, and the first exit surface and the second exit surface may be placed to face in opposite directions.

The reflection unit may be rotated around the rotation axis and may have a first rotation location at which the first exit surface faces the light-receiving unit and a second rotation location at which the second exit surface faces the light-receiving unit, and when the reflection unit is placed at the first rotation location, light may be incident from the side located in the first photographing direction and may be transmitted to the light-receiving unit by the first prism, and when the reflection unit is placed at the second rotation location, light may be incident from the side located in the second photographing direction and may be transmitted to the light-receiving unit by the second prism.

While the reflection unit is rotated, a thickness of the reflection unit in the first photographing direction may be constantly maintained. The reflection unit may be a mirror that reflects light both on a surface thereof and on a back side. A mirror may be used as the reflection unit so that aberration may be suppressed.

The reflection unit may be a mirror having a first reflection surface and a second reflection surface placed in an opposite direction to the first reflection surface, and the reflection unit may be rotated around the rotation axis and may have a first rotation location at which, on the first reflection surface, light incident from the side located in the first photographing direction is reflected into the light-receiving unit, and a second rotation location at which, on the second reflection surface, light incident from the side located in the second photographing direction is reflected into the light-receiving unit.

Two right-angled prisms may have different refraction characteristics. In the camera module according to the present disclosure, prisms having different refraction characteristics with respect to a complex prism in which reflection surfaces of two prisms face each other, so that photographing with different focal distances can be performed.

According to another aspect of the present disclosure, a camera module includes a reflection unit that reflects light incident from a side located in one direction of a first photographing direction and a second photographing direction opposite to the first photographing direction in a direction perpendicular to the first photographing direction and that is movable in a direction perpendicular to both the first photographing direction and the reflection direction, a light-receiving unit that captures an image by converting the light, which has been reflected by the reflection unit, into an electrical signal, and a movement unit that moves the reflection unit.

The camera module according to an embodiment may include a reflection unit that undergoes parallel translation in a direction of the light-receiving unit and in a direction perpendicular to a photographing direction, thereby selecting light incident from a side located in one direction of the first photographing direction and a second photographing direction opposite to the first photographing direction and reflecting the light in the direction of the light-receiving unit. Thus, since a shape change caused by parallel movement of the reflection unit does not affect the thickness direction of the camera module, elements by which bi-directional photographing including general photographing of scenery or the like and selfie photographing are implemented using one imaging unit, can be embedded in an electronic device with a slim shape.

The reflection unit may be a prism in which inclined surfaces of two right-angled prisms are orthogonal to each other. An optical distance is increased by a prism having a higher refractive index than that of air, and an optical path having a predetermined length can be obtained.

The reflection unit may include a first prism including a first incidence surface facing in the first photographing direction, a first exit surface facing in a direction perpendicular to the first photographing direction, and a first reflection surface on which light incident through the first incidence surface is reflected facing toward the first exit surface, and a second prism including a second incidence surface facing in the second photographing direction, a second exit surface facing in a direction perpendicular to the second photographing direction, and a second reflection surface on which light incident through the second incidence surface is reflected facing toward the second exit surface.

The first prism and the second prism may be arranged along a movement direction of the reflection unit, and the first reflection surface and the second reflection surface may be orthogonal to each other, and the first incidence surface and the second incidence surface may be placed to face in opposite directions, and the first exit surface and the second exit surface may be placed to face in the same direction.

The reflection unit may be a mirror in which reflection surfaces of two mirrors are orthogonal to each other. A mirror may be used as the reflection unit so that aberration can be suppressed.

The reflection unit may have a first reflection mirror having a first reflection surface on which light incident from a side located in the first photographing direction is reflected in the light-receiving unit, and a second reflection mirror having a second reflection surface on which light incident from a side located in the second photographing direction is reflected in the light-receiving unit, and the first reflection surface and the second reflection surface may be orthogonal to each other.

According to another aspect of the present disclosure, an electronic device including a camera module capable of selectively capturing an image in a first photographing direction or in a second photographing direction opposite to the first photographing direction, includes a reflection unit that is movable between a first location, at which light incident from a side located in the first photographing direction is reflected in a direction perpendicular to the first photographing direction, and a second location, at which light incident from a side located in the second photographing direction is reflected in a direction perpendicular to the first photographing direction, and a light-receiving unit that captures an image by converting the light, which has been reflected by the reflection unit, into an electrical signal, wherein, during the movement of the reflection unit, a thickness of the reflection unit is constantly maintained in the first photographing direction of the reflection unit.

The reflection unit may be rotated around a rotation axis that is parallel to the first photographing direction and may be moved.

The reflection unit may have a first prism including a first incidence surface facing in the first photographing direction, a first exit surface facing in a direction perpendicular to the first photographing direction, and a first reflection surface on which light incident through the first incidence surface is reflected facing toward the first exit surface, and a second prism including a second incidence surface facing in the second photographing direction, a second exit surface facing in a direction perpendicular to the second photographing direction, and a second reflection surface on which light incident through the second incidence surface is reflected facing toward the second exit surface, and the first reflection surface and the second reflection surface may be in contact with each other, and the first incidence surface and the second incidence surface may be placed to face in opposite directions, and the first exit surface and the second exit surface may be placed to face in opposite directions.

The reflection unit may be rotated around the rotation axis and may have a first rotation location at which the first exit surface faces the light-receiving unit and a second rotation location at which the second exit surface faces the light-receiving unit, and when the reflection unit is at the first rotation location, light may be incident from the side located in the first photographing direction and may be transmitted to the light-receiving unit by the first prism, and when the reflection unit is at the second rotation location, light may be incident from the side located in the second photographing direction and may be transmitted to the light-receiving unit by the second prism.

The camera module may further include a magnet placed in the reflection unit and a Hall sensor configured to detect a location of the magnet so that a rotation position of the reflection unit can be detected.

The first prism and the second prism may have different refraction characteristics.

The reflection unit may undergo parallel translation in a direction parallel to both the first photographing direction and the reflection direction.

The reflection unit may have a first prism including a first incidence surface facing in the first photographing direction, a first exit surface facing in a direction perpendicular to the first photographing direction, and a first reflection surface on which light incident through the first incidence surface is reflected facing toward the first exit surface, and a second prism including a second incidence surface facing in the second photographing direction, a second exit surface facing in a direction perpendicular to the second photographing direction, and a second reflection surface on which light incident through the second incidence surface is reflected facing toward the second exit surface, and the first prism and the second prism may be arranged along a movement direction of the reflection unit, and the first reflection surface and the second reflection surface may be orthogonal to each other, and the first incidence surface and the second incidence surface may be placed to face in opposite directions, and the first exit surface and the second exit surface may be placed to face in opposite directions.

In a camera module and an electronic device including the same, according to the present disclosure, elements for realizing bi-directional photographing of general photographing, which includes photographing scenery or the like, and selfie photographing, which involves a photographer photographing himself or herself, using one imaging unit can be embedded in an electronic device with a slim shape.

DETAILED DESCRIPTION

Figure 1A:
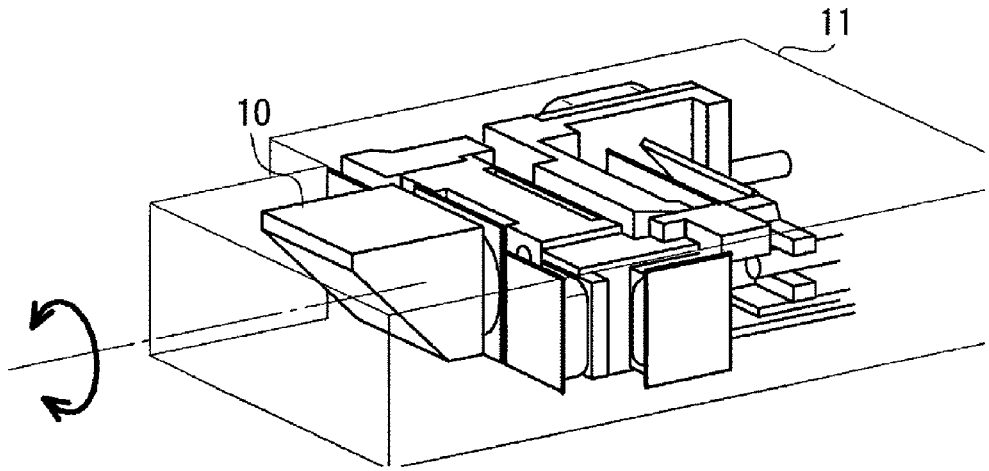
FIGS. 1A, 1B, and 1C are schematic views of one example in which an optical unit is accommodated in a thinly shaped case.
Figure 1B:
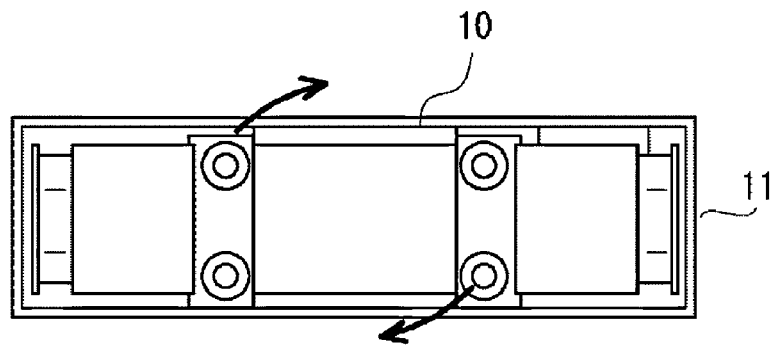
Figure 1C:
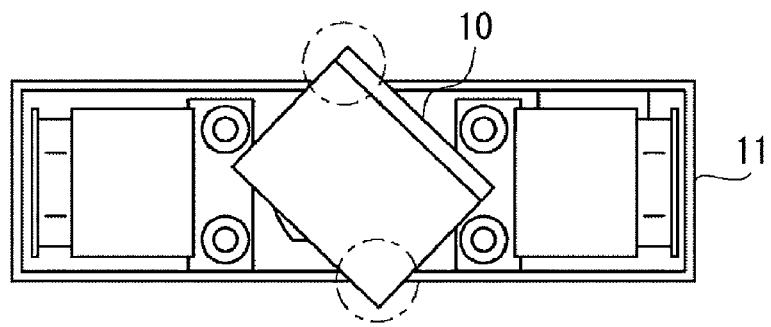

Hereinafter, embodiments of the present disclosure will be described in detail with reference to the accompanying drawings. In descriptions of the drawings, like reference numerals are used for like elements, and redundant descriptions thereof will be omitted.

Embodiment 1

Figure 2:
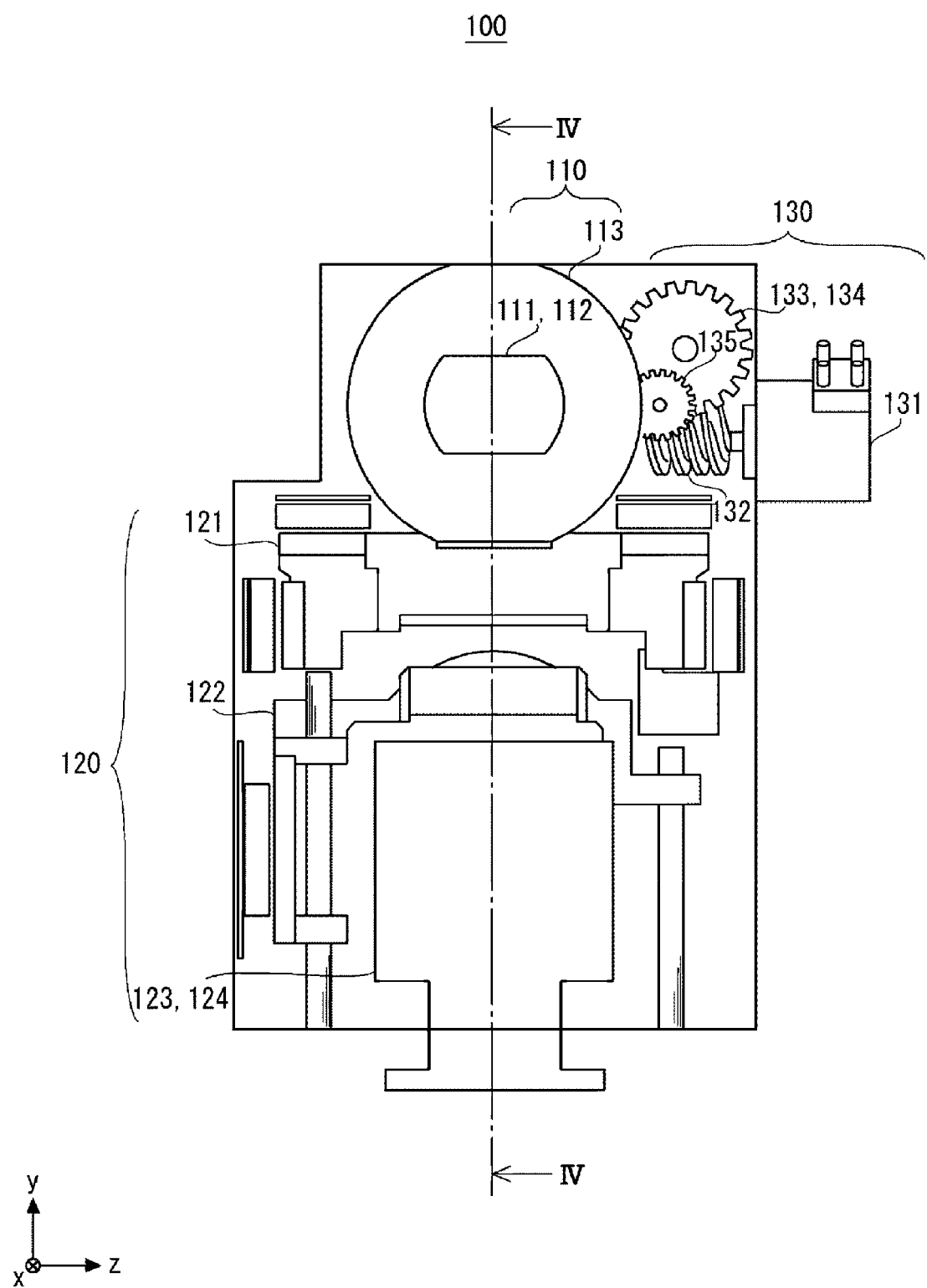
FIG. 2 is a main-surface perspective view of one example of a configuration of a camera module according to Embodiment 1 of the present disclosure.
Figure 3:
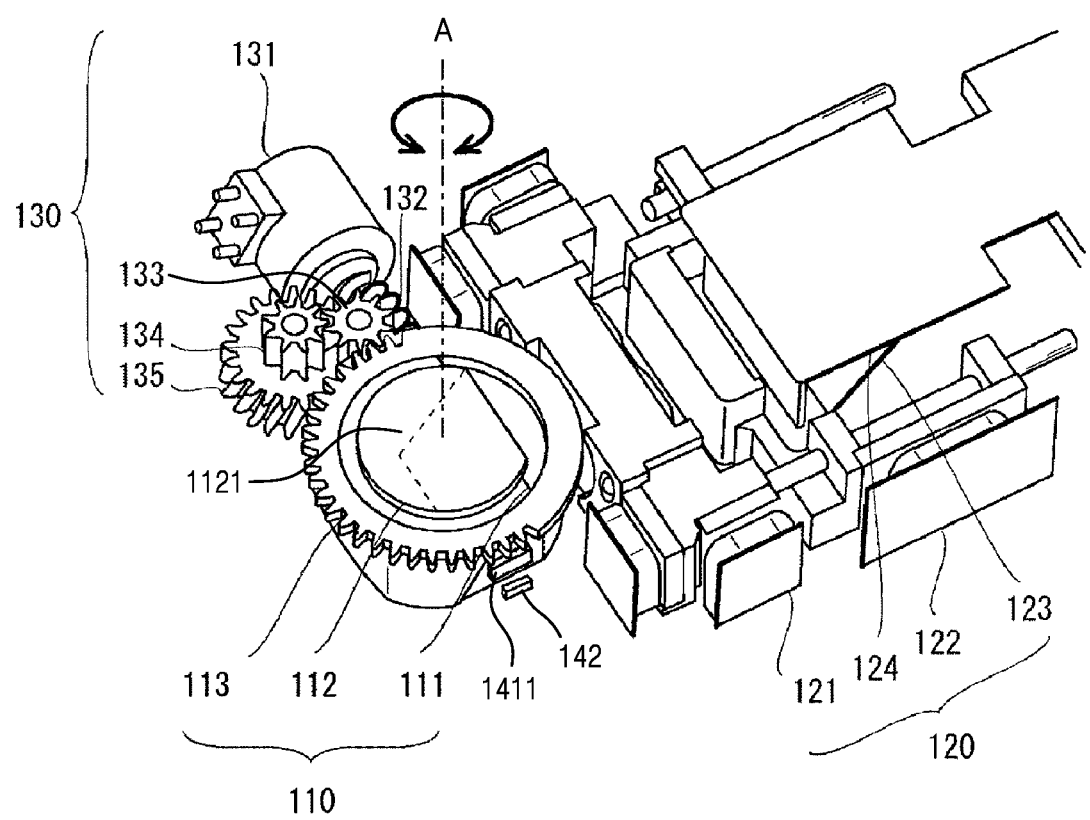
FIG. 3 is a perspective view of one example of a configuration of a camera module according to Embodiment 1 of the present disclosure.
Figure 4:
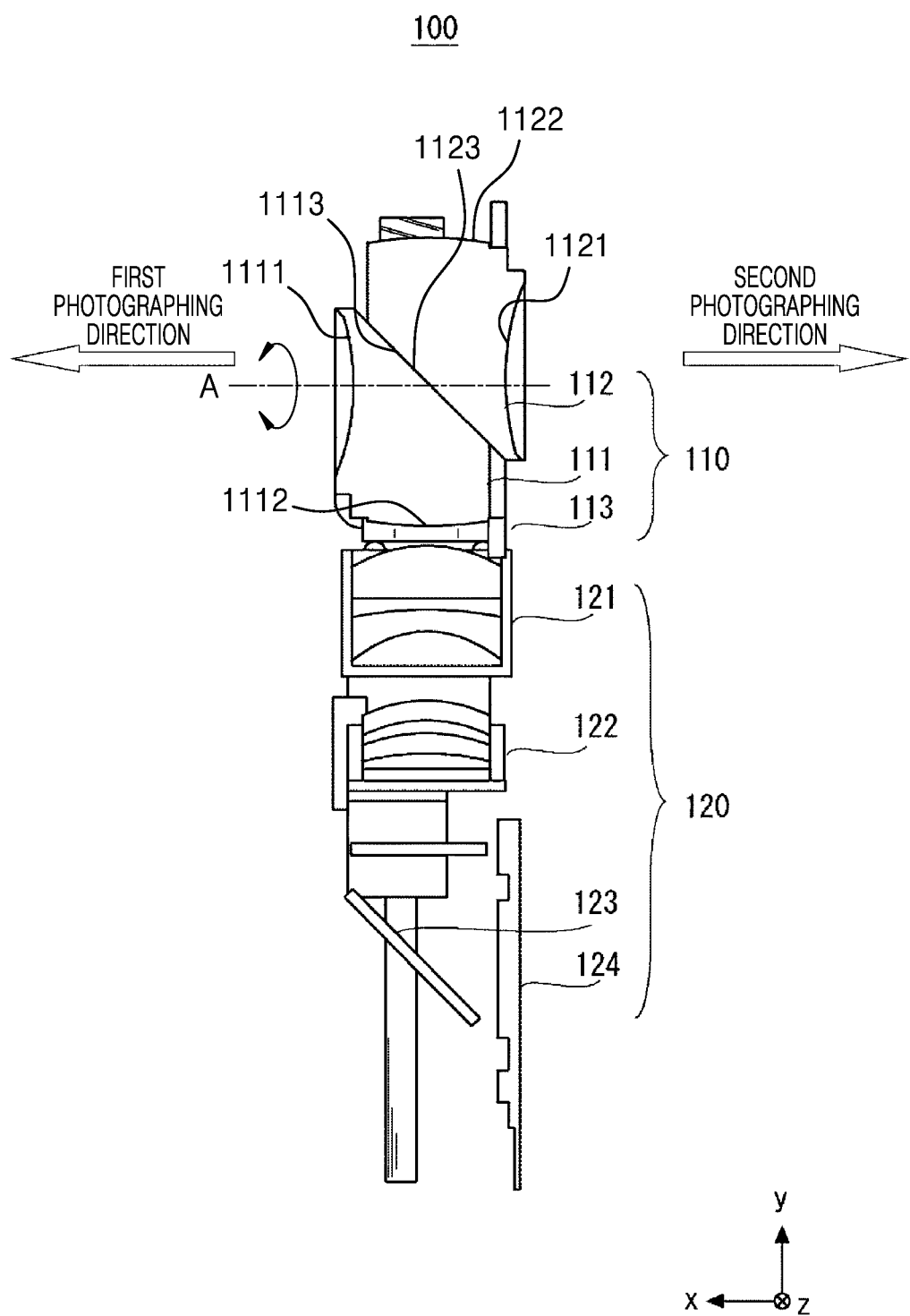
FIG. 4 is a cross-sectional view of one example of a configuration of a camera module according to Embodiment 1 of the present disclosure.
Figure 5:
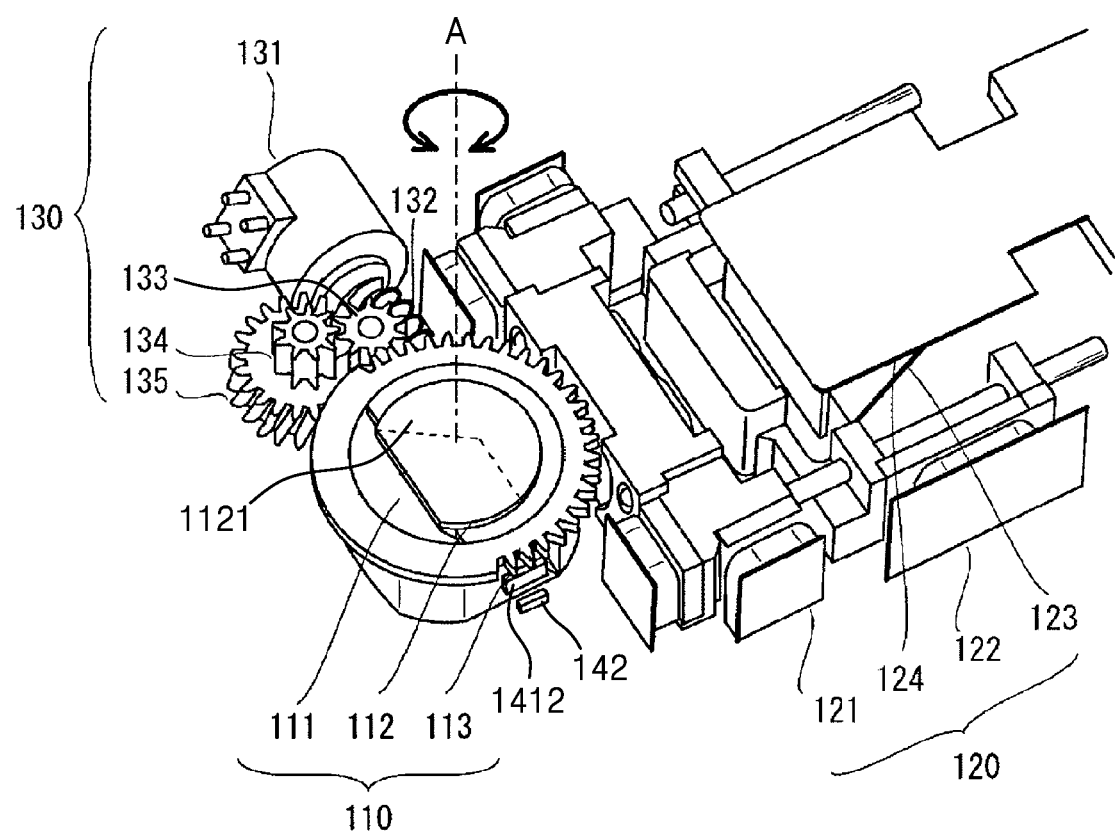
FIG. 5 is a perspective view of one example of a configuration of a camera module according to Embodiment 1 of the present disclosure.
Figure 6:
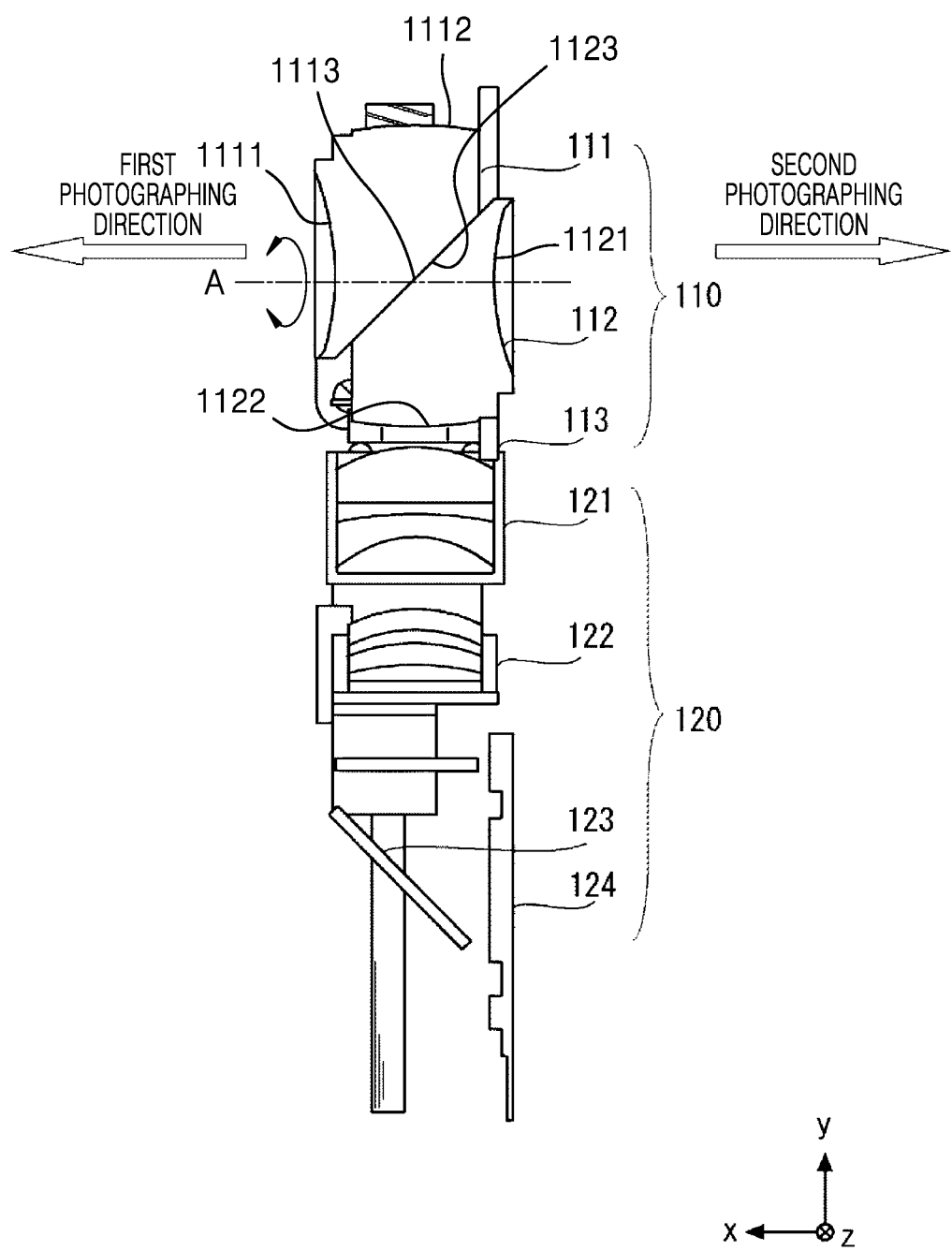
FIG. 6 is a cross-sectional view of one example of a configuration of a camera module according to Embodiment 1 of the present disclosure.

Hereinafter, embodiments of the present disclosure will be described with reference to the accompanying drawings. FIG. 2 is a front perspective view of one example of a configuration of a camera module according to Embodiment 1 of the preset disclosure. FIGS. 3 and 5 are perspective views of one example of a configuration of a camera module according to Embodiment 1 of the preset disclosure. FIGS. 4 and 6 are cross-sectional views taken along line IV-IV of FIG. 2 illustrating an example of a configuration of a camera module according to Embodiment 1 of the present disclosure. In each of the drawings, a first photographing direction (a direction in which scenery or the like is photographed) and a second photographing direction (a selfie photographing direction) that is opposite to the first photographing direction are referred to as an X-axis direction, and a direction perpendicular to the first photographing direction (a direction of a light-receiving unit 120) is referred to as a Y-axis direction, and a direction perpendicular to the X-axis and the Y-axis is referred to as a Z-axis direction.

For the first time, the configuration of a camera module 100 illustrated in FIGS. 2 through 6 will be described, and subsequently, an operation of changing a photographing direction will be described.

Referring to FIGS. 2 through 6, the camera module 100 includes a reflection unit 110, a light-receiving unit 120, and a rotation unit (or a rotation movement unit) 130. The reflection unit 110 includes a first prism 111, a second prism 112, and a gear 113. Also, the light-receiving unit 120 includes an image stabilization unit 121, a focusing unit 122, a mirror 123, and a light-receiving element 124. The rotation unit 130 includes a motor 131, a worm 132, a worm wheel 135, a gear 134, and a gear 133.

First, the configuration of the reflection unit 110 will be described.

The first prism 111 and the second prism 112 are made of light-transmitting materials and each have a reflection surface on which light is reflected in an inclined surface with respect to an incidence direction of light.

The first prism 111 reflects light incident from a side located in a first photographing direction, for example, the side located in a main photographing direction, in a direction perpendicular to the first photographing direction. Here, the light incident from the side located in the first photographing direction is defined as light reflected by an object placed in the first photographing direction.

For example, the first prism 111 may have a first incidence surface 1111 toward the first photographing direction, a first exit surface 1112 toward a direction perpendicular to the first photographing direction, and a first reflection surface 1113 on which light incident through the first incidence surface 1111 is reflected to be toward the first exit surface 1112.

The first incidence surface 1111 and the first exit surface 1112 may be approximately orthogonal to each other, and the first reflection surface 1113 may have an angle of 45° with respect to the first incidence surface 1111 and the first exit surface 1112, respectively. Also, for example, the first prism 111 may have the first incidence surface 1111 with a concave shape and the first exit surface 1112 with a convex shape.

The second prism 112 reflects light incident from a side located in a second photographing direction that is opposite to the first photographing direction, for example, from a side located in a selfie photographing direction in a direction perpendicular to the first photographing direction. Here, the light incident from the side located in the second photographing direction is defined as light reflected by an object placed in the second photographing direction.

For example, the second prism 112, similarly to the first prism 111, may have a second incidence surface 1121 toward the second photographing direction, a second exit surface 1122 toward a direction perpendicular to the second photographing direction, and a second reflection surface 1123 on which light incident through the second incidence surface 1121 is reflected to be toward the second exit surface 1112.

The second incidence surface 1121 and the second exit surface 1122 may be approximately orthogonal to each other, and the second reflection surface 1123 may have an angle of 45° with respect to the second incidence surface 1121 and the second exit surface 1122, respectively. Also, for example, the second prism 112 may have the second incidence surface 1121 with a concave shape and the second exit surface 1122 with a convex shape.

As illustrated in FIG. 4, the first prism 111 and the second prism 112 may be in contact with each other in a state in which the first and second reflection surfaces 1113 and 1123 face each other. In an example, the first and second reflection surfaces 1113 and 1123 may be fixed to each other by adhesion. The first incidence surface 1111 and the second incidence surface 1121 may be placed approximately parallel to each other, and the first exit surface 1112 and the second exit surface 1122 may be placed approximately parallel to each other. The first incidence surface 1111 and the second incidence surface 1121 may be placed in opposite directions, and the first exit surface 1112 and the second exit surface 1122 may be placed in opposite directions.

The gear 113 may be a hollow gear having sawteeth on its outer circumference and a hole in its center. The gear 113 passes through light from a photographing direction through the hole in its center and is fixed to the first prism 111 and the second prism 112 at a location at which the light is guided onto the first and second reflection surfaces 1113 and 1123 of the first prism 111 and the second prism 112, respectively. Also, the gear 113 has sawteeth on a half of the outer circumference and no sawteeth on the other half of the outer circumference so that a rotational angle of the gear 113 can be defined within 180°. That is, the rotational angle is defined as 180° from a first rotation location at which the first prism 111 reflects the light incident from the side located in the first photographing direction in a direction of a light-receiving unit, to a second rotation location at which the second prism 112 reflects the light incident from the side located in the second photographing direction in the direction of the light-receiving unit.

Also, the camera module 100 may further include elements for controlling a rotation location of the reflection unit 110. For example, the camera module 100 may further include first and second magnets 1411 and 1412 placed in the reflection unit 110, and a Hall sensor 142 spaced apart from the first and second magnets 1411 and 1412. The first magnet 1411 is placed at a side of the first prism 111, and the second magnet 1412 is placed at a side of the second prism 112. The first and second magnets 1411 and 1412 are rotated and moved together with rotation of the reflection unit 110, and the location of the Hall sensor 142 is fixed regardless of rotation of the reflection unit 110. The camera module 100 may detect locations of the first and second magnets 1411 and 1412 using the Hall sensor 142. Thus, the camera module 100 may control the reflection unit 110 to stop in a location at which the reflection unit 110 is rotated by 180°.

The reflection unit 110 including the first prism 111, the second prism 112, and the gear 113 is configured to be rotatable around a rotation axis A that is a direction parallel to the first photographing direction. For example, a bearing is placed on an outer circumference of the reflection unit 110 so that the reflection unit 110 is rotatable.

The reflection unit 110 is rotated around the rotation axis A approximately perpendicular to a direction of the light-receiving unit 120, by the rotation unit 130. Due to rotation of the reflection unit 110, light incident from a side located in one direction of the first photographing direction (a direction in which scenery or the like is photographed) and the second photographing direction (a selfie photographing direction) that is opposite to the first photographing direction is selectively reflected in the direction of the light-receiving unit.

That is, while being rotated around the rotation axis A that is a direction approximately perpendicular to the direction of the light-receiving unit, the reflection unit 110 may be changed to a state in which light from the second photographing direction is reflected in the direction of the light-receiving unit, from a state in which light from the first photographing direction is reflected in the direction of the light-receiving unit. Also, a reverse change thereof is possible.

Subsequently, the configuration of the light-receiving unit 120 will be described.

The image stabilization unit 121 is placed on an optical path between the reflection unit 110 and the focusing unit 122 and performs image stabilization during photographing. For example, the image stabilization unit 121 mounts a correction lens having a vibration gyro mechanism and moves the correction lens in a direction in which hand-shake is removed, thereby correcting an optical axis. Optical image stabilization is performed.

The focusing unit 122 is placed on an optical path between the image stabilization unit 121 and the mirror 123 and performs focusing during photographing. For example, the focusing unit 122 adjusts a focus using an actuator that moves lenses in the direction of the light-receiving unit. Also, the focusing unit 122 may include a liquid lens.

The mirror 123 reflects light that passes through the first prism 111, the second prism 112, the image stabilization unit 121 and the focusing unit 122 to guide the light in a direction of the light-receiving element 124.

The light-receiving element 124 converts the received light into an electrical signal and captures an image. For example, the light-receiving element 124 includes a charge-coupled device (CCD) image sensor or a complementary metal-oxide semiconductor (CMOS) image sensor.

In an example, the light-receiving element 124 is placed on an electronic circuit substrate parallel to a main surface perpendicular to the first photographing direction of the camera module 100 and receives light reflected by the mirror 123. A light-receiving surface of the light-receiving element 124 may be parallel to the main surface of the camera module 100.

In another example, although not shown, the light-receiving element 124 may be placed so that the light-receiving surface of the light-receiving element 124 is perpendicular to a light-receiving axis. In this case, the mirror 123 is unnecessary.

Through this configuration, the light-receiving unit 120 performs image stabilization and focusing, captures an image, and obtains image data.

And, the rotation unit 130 will be described.

The motor 131 generates a magnetic field by power and rotates the worm 132. For example, the motor 131 may include a stepping motor.

The worm 132 is a screw-shaped gear and is fixed to a rotation axis of the motor 131.

The worm wheel 135 is a helical gear and is fixed to the same rotation axis as that of the gear 134. The screw-shaped gear of the worm 132 and the helical gear of the worm wheel 135 are engaged with each other so that Z-axis rotation from the motor 131 is converted into X-axis rotation.

The gear 134 is a gear having sawteeth on its outer circumference and is placed to be engaged with the gear 133.

The gear 133 is a gear having sawteeth on its outer circumference and is placed so that the gear 134 and the gear 113 are engaged with each other.

Through this configuration, the rotation unit 130 may rotate the reflection unit 110 around the rotation axis A that is a direction parallel to the photographing direction (X-axis).

Through the above-described configuration of the reflection unit 110, the light-receiving unit 120 and the rotation unit 130, the camera module 100 rotates the reflection unit 110 around the rotation axis A that is a direction parallel to the first photographing direction, thereby converting the photographing direction into the first photographing direction or the second photographing direction.

Subsequently, an operation of converting the photographing direction will be described. When scenery or the like in the first photographing direction is photographed, the reflection unit 110 may be placed in a first location at which the light incident from the side located in the first photographing direction is reflected in the direction of the light-receiving unit, as illustrated in FIGS. 3 and 4. For example, the first prism 111 is placed to reflect the light incident from the side located in the first photographing direction in the direction of the light-receiving unit. That is, a first exit surface 1112 of the first prism 111 between the first prism 111 and the second prism 112 is placed in a first rotation location toward the light-receiving unit 120. Thus, the light incident from the side located in the first photographing direction may be reflected by the first prism 111, may proceed in the direction of the light-receiving unit and may be incident on the light-receiving unit 120. As a result, photographing (photographing of scenery or the like) in the first photographing direction can be performed.

Here, when photographing is performed in the selfie photographing direction, i.e., the second photographing direction that is opposite to the first photographing direction, the reflection unit 110 is rotated by 180° around the rotation axis A that is a direction parallel to the first photographing direction. As a result of rotation, the reflection unit 110 may be placed in a second location at which light incident from the side located in the second photographing direction is reflected in the direction of the light-receiving unit, as illustrated in FIGS. 5 and 6. For example, a second exit surface 1122 of the second prism 112 between the first prism 111 and the second prism 112 is placed in a second rotation location toward the light-receiving unit 120. Thus, the light incident from the side located in the second photographing direction may be reflected by the second prism 112, may proceed in the direction of the light-receiving unit, and may be incident onto the light-receiving unit 120. As a result, photographing (selfie photographing) in the second photographing direction can be performed.

Figure 7:
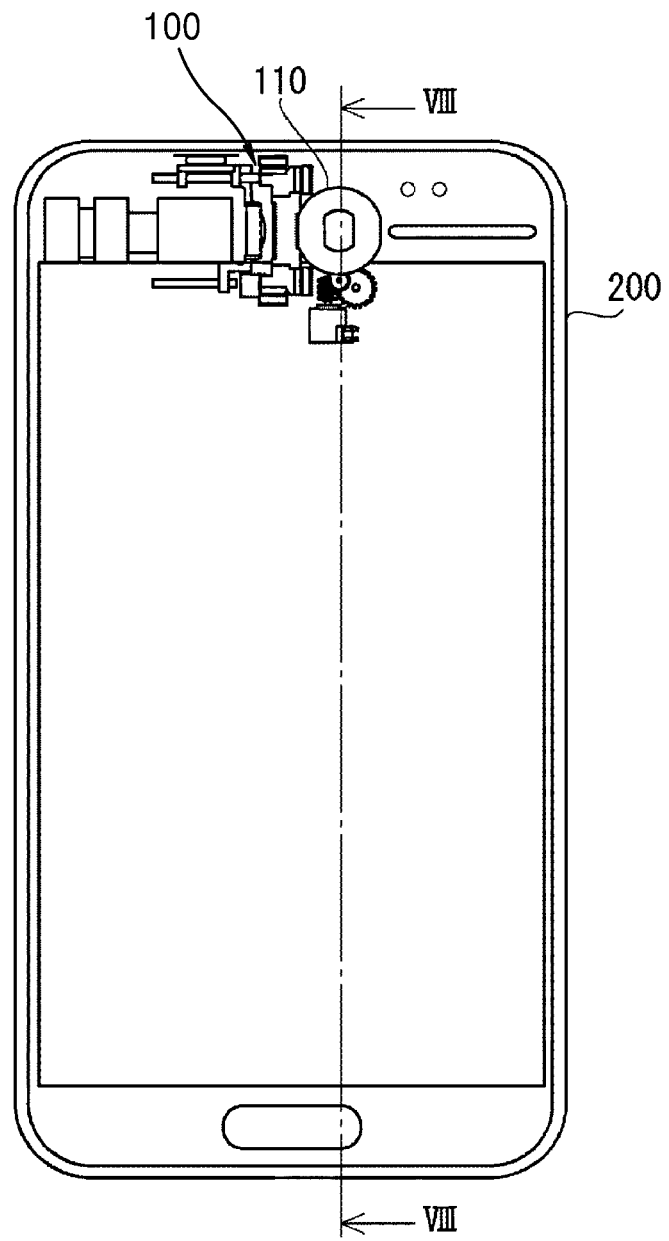
FIG. 7 is a front perspective view of one example of an electronic device including a camera module according to Embodiment 1 of the present disclosure.
Figure 8:
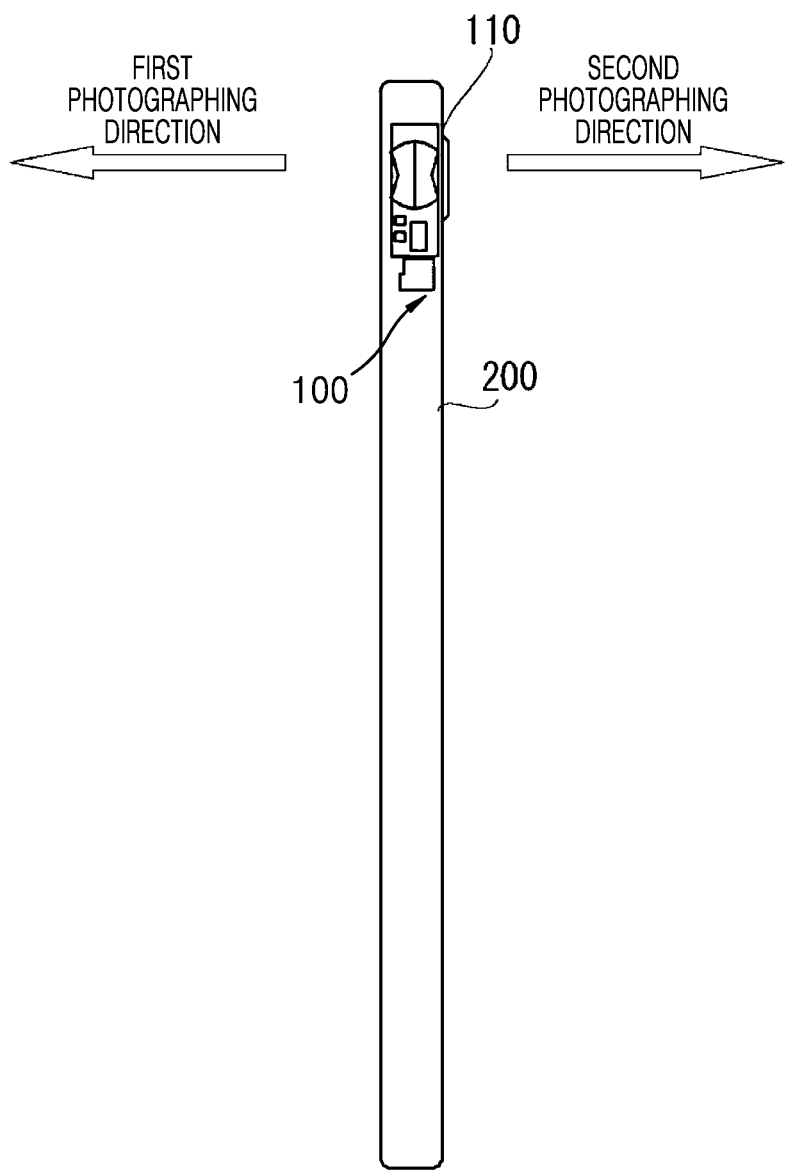
FIG. 8 is a cross-sectional perspective view of one example of an electronic device including a camera module according to Embodiment 1 of the present disclosure.
Figure 9:
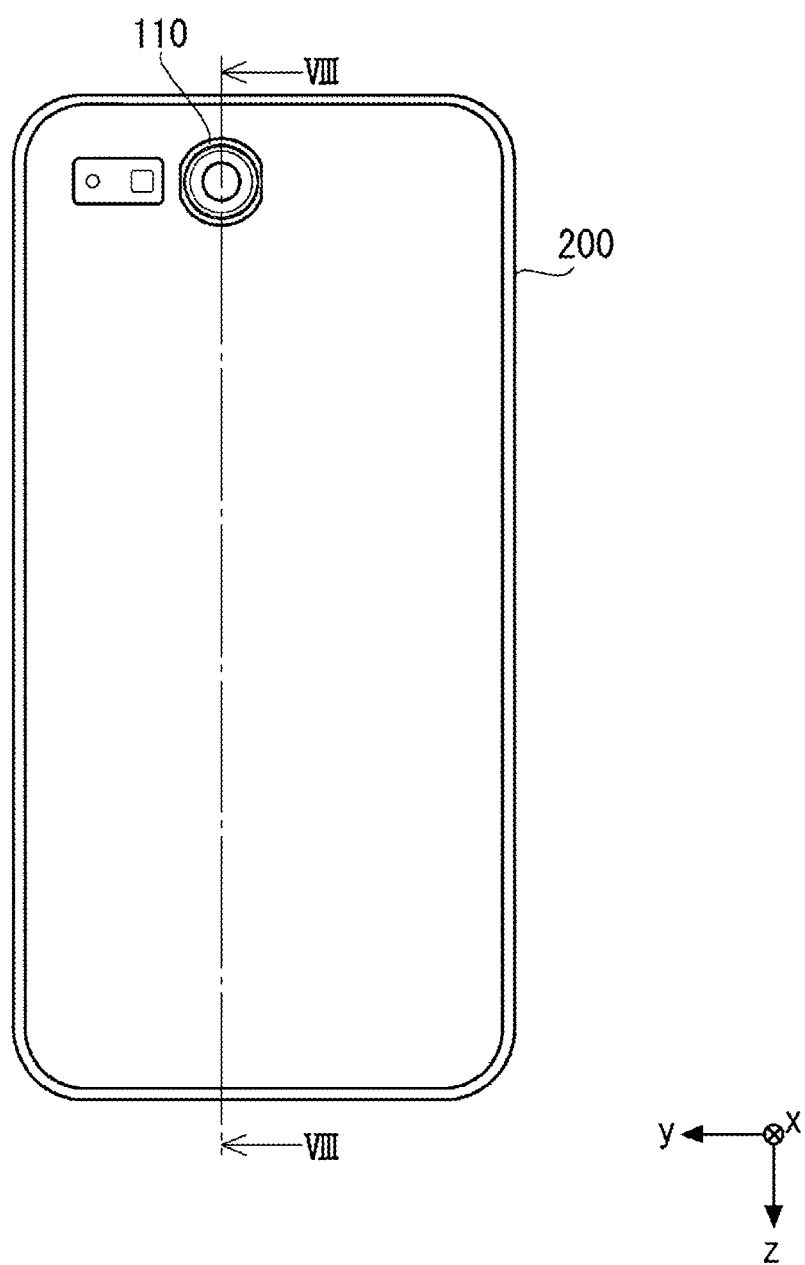
FIG. 9 is a rear perspective view of one example of an electronic device including a camera module according to Embodiment 1 of the present disclosure.

An example in which the camera module 100 is mounted on an electronic device with a slim shape, will be described using FIGS. 7 through 9. FIG. 7 is a front perspective view illustrating an example of an electronic device including the camera module according to Embodiment 1. Also, FIG. 8 is a cross-sectional perspective view taken along line VIII-VIII illustrating an example of an electronic device including the camera module according to Embodiment 1. FIG. 9 is a rear perspective view illustrating an example of the electronic device including the camera module according to Embodiment 1.

As illustrated in FIG. 7, the camera module 100 is placed inside a case of an electronic device 200 with a slim shape. A thickness of the electronic device 200 with a slim shape in a forward/backward direction, for example, in the X-axis direction may be equal to or less than 10 mm.

On a front surface of the electronic device 200, a first opening is formed in a location corresponding to the reflection unit 110. In this way, even on a rear surface of the electronic device 200, a second opening is formed at a position corresponding to the reflection unit 110, as illustrated in FIG. 9.

Meanwhile, when converting photographing of scenery or the like through the rear-surface second opening into selfie photographing through the front-surface first opening, the camera module 100 rotates the reflection unit 110. Here, the reflection unit 110 is rotated around the rotation axis A that is a direction parallel to the first photographing direction, a shape change due to rotation of the reflection unit does not affect a thickness direction, i.e., the photographing direction (the X-axis) of the camera module 100 illustrated in the cross-sectional view of FIG. 8.

In this way, in the camera module according to Embodiment 1, the reflection unit 110 is rotated around the rotation axis A that is a direction parallel to the first photographing direction so that incident from the side located in one direction of the first photographing direction and the second photographing direction may be selectively reflected in the direction of the light-receiving unit. Thus, since the shape change due to rotation of the reflection unit 110 does not affect the thickness direction of the camera module, elements by which bi-directional photographing including general photographing, which includes photographing scenery or the like, and selfie photographing, which involves a photographer photographing himself or herself, is realized by one imaging unit, may be embedded in the electronic device 200 with a slim shape.

In other words, in the camera module 100 according to Embodiment and the electronic device 200 including the same, the reflection unit 110 may be rotated and moved between the first location at which the light incident from the side located in the first photographing direction is reflected in a direction perpendicular to the first photographing direction and the second location at which the light incident from the side located in the second photographing direction is reflected in a direction perpendicular to the first photographing direction, and while the reflection unit 110 is rotated and moved, the thickness of the reflection unit 110 in the first photographing direction may be constantly maintained. Thus, the electronic device 200 with a slim shape that realizes bi-directional photographing using one imaging unit may be implemented.

Also, in the camera module according to Embodiment 1, by using a complex prism in which first and second reflection surfaces of the first and second prisms face each other, an optical distance (an optical path length) may be increased by a prism having a higher refractive index than that of air, and an optical path having a predetermined length may be acquired.

Embodiment 2

In Embodiment 1, the reflection unit is configured using a complex prism in which reflection surfaces of two prisms face each other. However, in Embodiment 2, an example in which refraction characteristics of the two prisms are different from each other, will be described.

Figure 10:
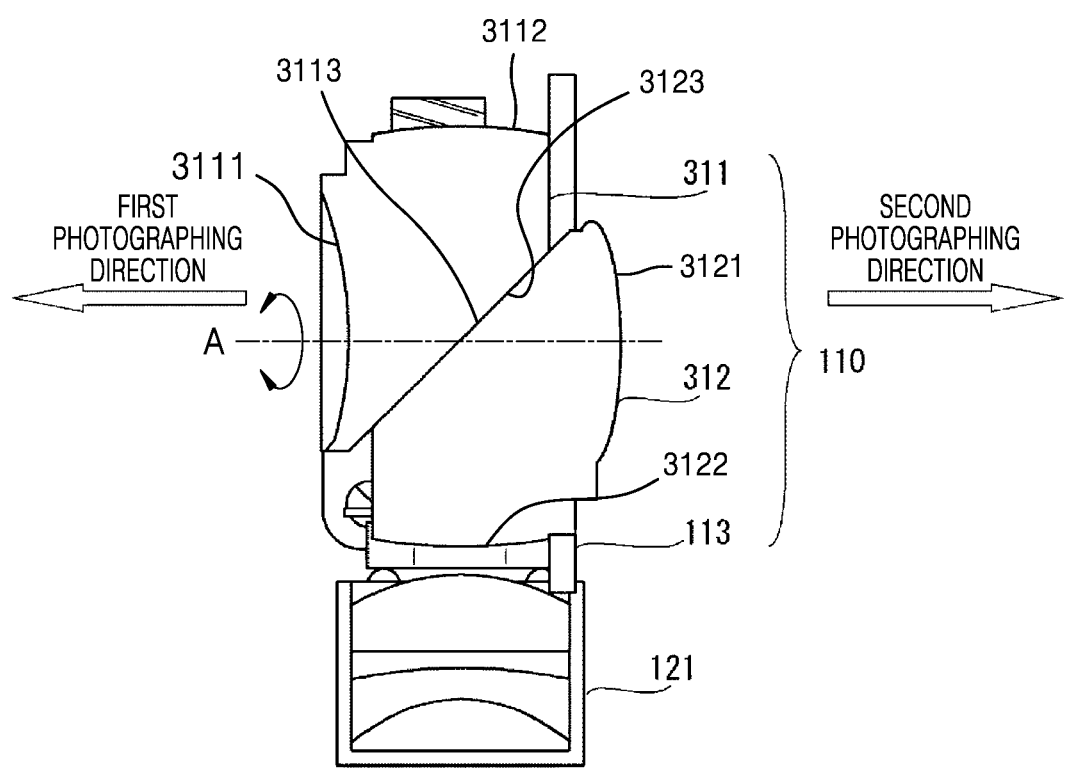
FIG. 10 is a cross-sectional view of one example of a reflection unit of a camera module according to Embodiment 2 of the present disclosure.
Figure 10:
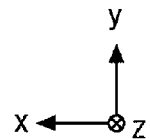

FIG. 10 is a cross-sectional view of an example of a reflection unit of a camera module according to Embodiment 2. In FIG. 10, the same reference numerals are used for the same elements as those of FIGS. 2 to 6, and a description thereof will be omitted. In FIG. 10, the reflection unit 110 includes a prism 311, a prism 312, and a gear 113.

The first prism 311 and the second prism 312 are made of light-transmitting materials and have first and second reflection surfaces 3113 and 3123, respectively, on which light is reflected from an inclined surface.

The first prism 311 is a prism that reflects light incident from the side located in the first photographing direction in a direction of the light-receiving unit. For example, the first prism 311 is a prism in which a first incidence surface 3111 and a first exit surface 3112 are approximately orthogonal to each other and the first reflection surface 3113 has an angle of 45° with respect to the first incidence surface 3111 and the first exit surface 3112, respectively.

The second prism 312 is a prism that reflects light incident from the side located in the second photographing direction in a direction of a light-receiving unit. For example, in the second prism 312, similarly to the first prism 311, a second incidence surface 3121 and a second exit surface 3122 are approximately orthogonal to each other, and the second reflection surface 3123 has an angle of 45° with respect to the second incidence surface 3121 and the second exit surface 3122, respectively.

The first prism 311 and the second prism 312 have varying refraction characteristics.

For example, when long-distance photographing such as scenery or the like is performed in the first photographing direction and short-distance photographing such as selfie photographing is performed in the second photographing direction, a focal distance of the first prism 311 for the first photographing direction is increased, and a focal distance of the second prism 312 for the second photographing direction is decreased.

Also, for example, the first prism 311 has a first incidence surface 3111 with a concave shape and a first exit surface 3112 with a convex shape. Meanwhile, the second prism 312 has a second incidence surface 3121 with a convex shape and a second exit surface 3122 with a convex shape.

In this way, in the camera module according to Embodiment 2, prisms having different refraction characteristics face each other with respect to the complex prism in which reflection surfaces of two prisms face each other, so that photographing having different focal distances may be performed.

Also, in the above embodiment, shapes of the first incidence surface 3111 and the second incidence surface 3121 of the first and second prisms 311 and 312 are different from each other. However, embodiments of the present disclosure are not limited thereto. For example, materials of prisms having different refractive indexes are combined with each other using the first and second prisms 311 and 312 so that refraction characteristics of the two prisms may be different from each other.

Embodiment 3

In Embodiment 3, first and second reflection surfaces of two, first and second prisms are orthogonal to each other and are placed parallel to each other and undergo parallel translation in a direction of a light-receiving unit and in a direction perpendicular to photographing direction so that light is selected from one of a first photographing direction and a second photographing direction and is reflected in the direction of the light-receiving unit.

Figure 11:
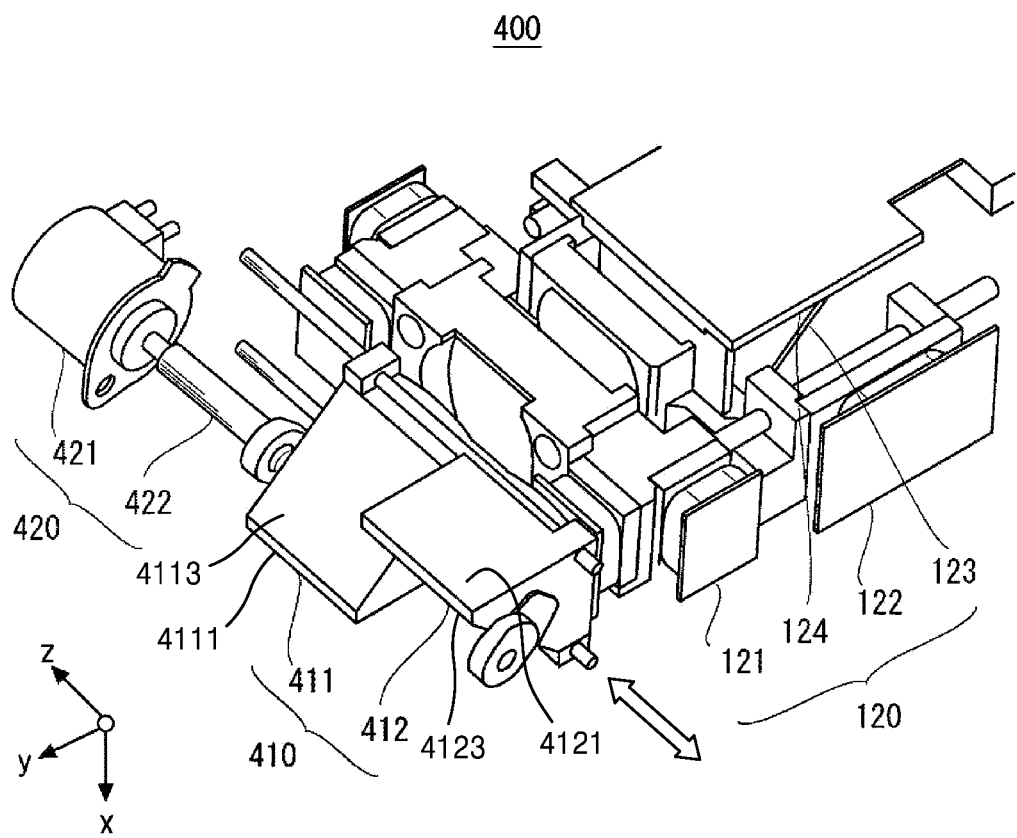
FIG. 11 is a perspective view of one example of a configuration of a camera module according to Embodiment 3 of the present disclosure.
Figure 12:
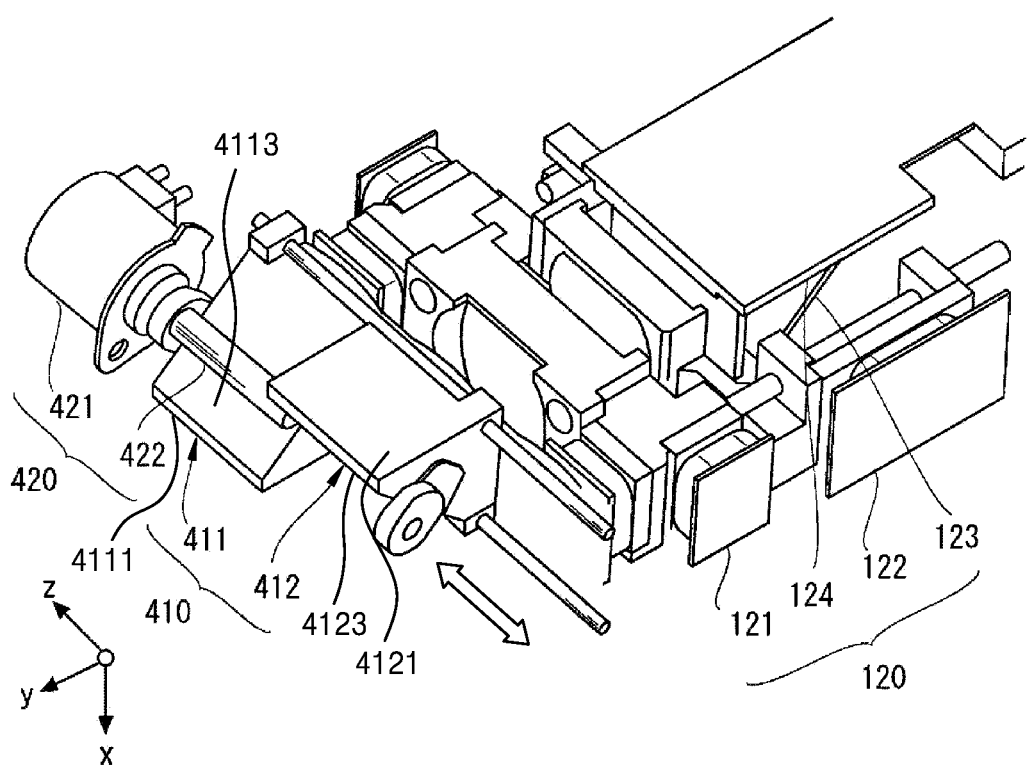
FIG. 12 is a perspective view of one example of a configuration of a camera module according to Embodiment 3 of the present disclosure.
Figure 13:
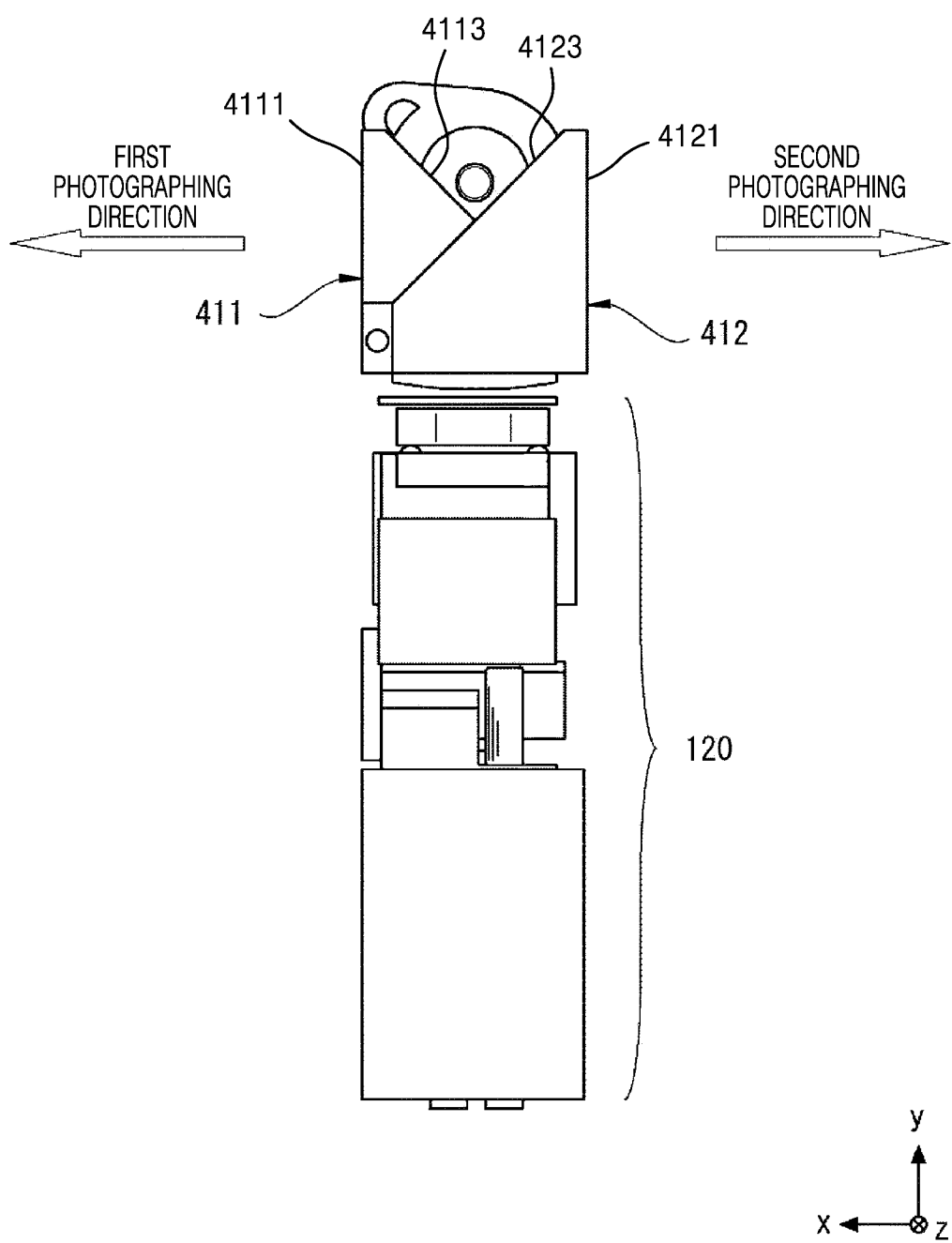
FIG. 13 is side view of one example of a configuration of a camera module according to Embodiment 3 of the present disclosure.

FIGS. 11 and 12 are perspective views illustrating an example of a configuration of a camera module according to Embodiment 3. Also, FIG. 13 is a side view illustrating an example of the configuration of the camera module according to Embodiment 3. In FIGS. 11 through 13, the same reference numerals are used for the same elements as those of FIGS. 2 through 6, and a description thereof will be omitted.

In FIGS. 11 to 13, a camera module 400 includes a reflection unit 410, a light-receiving unit 120, and a parallel movement unit 420.

The reflection unit 410 includes a first prism 411 and a second prism 412. Also, the parallel movement unit 420 includes an actuator 421 and a shaft 422.

The first prism 411 and the second prism 412 are made of light-transmitting materials and have first and second reflection surfaces 4113 and 4123 on which light is reflected from an inclined surface.

The first prism 411 reflects light incident from a side located in a first photographing direction in the direction of the light-receiving unit. For example, the first prism 411 is a prism in which a first incidence surface 4111 and a first exit surface are approximately orthogonal to each other and the first reflection surface 4113 has an angle of 45° with respect to the first incidence surface 4111 and the first exit surface, respectively. Also, for example, the prism 411 may have the first incidence surface 4111 with a concave shape and the first exit surface with a convex shape.

The second prism 412 is a prism that reflects light incident from a side located in a second photographing direction in the direction of the light-receiving unit. For example, the second prism 412, similarly to the first prism 411, is a prism in which a second incidence surface 4121 and a second exit surface are approximately orthogonal to each other and the second reflection surface 4123 has an angle of 45° with respect to the second incidence surface 4121 and the second exit surface. Also, for example, the second prism 412 may have the second incidence surface 4121 with a concave shape and the second exit surface with a convex shape.

Figure 14:
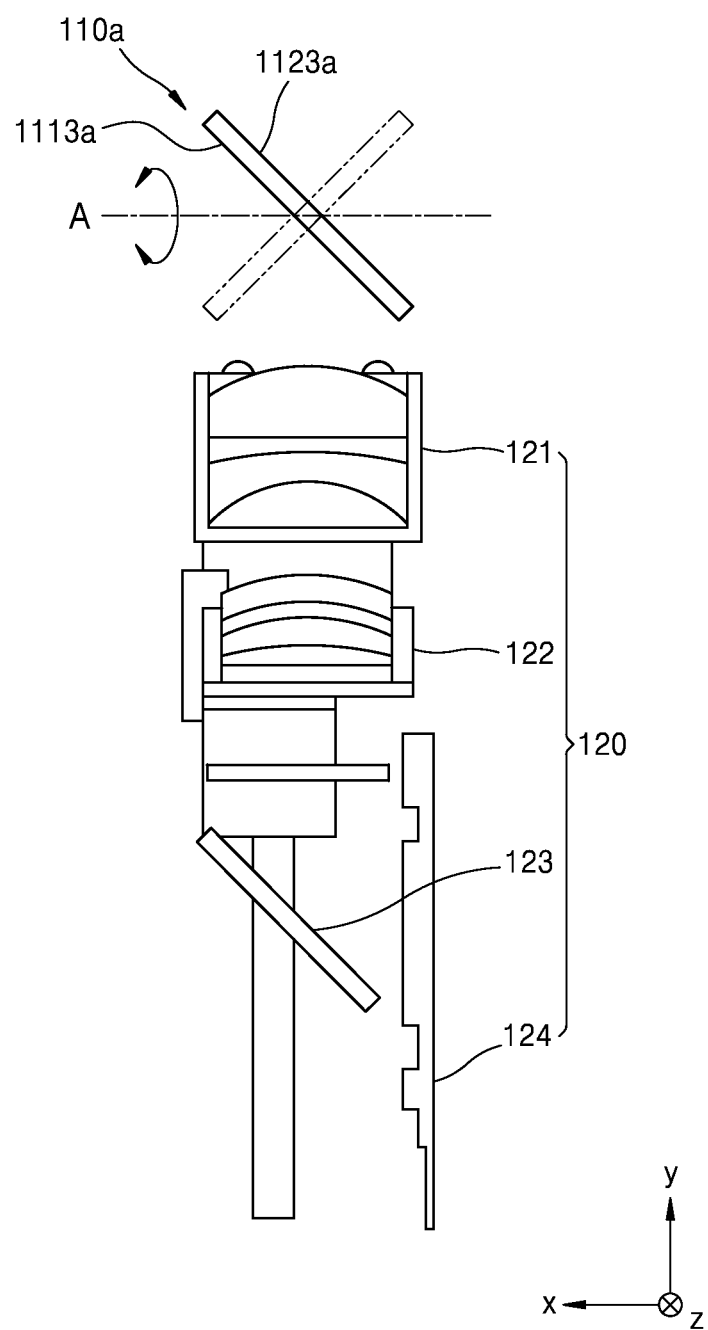
FIG. 14 is a cross-sectional view of one example of a configuration of a camera module according to Embodiment 4 of the present disclosure.

As illustrated in FIGS. 12 through 14, the first prism 411 and the second prism 412 may be arranged in a direction perpendicular to both the first photographing direction and the reflection direction. The first prism 411 and the second prism 412 may be arranged in parallel in such a way that the first and second reflection surfaces 4113 and 4123 are orthogonal to each other. And, the first prism 411 and the second prism 412 are fixedly adhered to each other in a state in which sides, i.e., other sides than the reflection surface, the incidence surface and the exit surface, face each other. The first and second incidence surfaces 4111 and 4121 of the first prism 411 and the second prism 412 are placed approximately parallel to each other, and the first and second exit surfaces of the first prism 411 and the second prism 412 are equally fixed to be toward the light-receiving unit. The first incidence surface 4111 and the second incidence surface 4121 may be placed in opposite directions.

The actuator 421 is an actuator that drives a shaft 422 in the Z-axis direction in FIGS. 11 through 13. The actuator 421 allows the reflection unit 410 to undergo parallel translation in the direction of the light-receiving unit and in a direction perpendicular to the photographing direction (the Z-axis direction in FIGS. 12 through 14) using the shaft 422. For example, the actuator 421 may be a solenoid actuator using an electromagnetic force.

The shaft 422 is fixed to one end of the reflection unit 410 and transfers movement from the actuator 421.

Subsequently, an operation of converting the photographing direction into first and second photographing directions will be described. When scenery or the like is photographed in the first photographing direction, the first prism 411 is placed to reflect light incident from a side located in the first photographing direction in the direction of the light-receiving unit, as illustrated in FIG. 11. That is, the first prism 411 between the first prism 411 and the second prism 412 is placed in a first location corresponding to the light-receiving unit 120. Thus, the light incident from the side located in the first photographing direction may be reflected by the first prism 411, may proceed in the direction of the light-receiving unit and may be incident onto the light-receiving unit 120. As a result, photographing in the first photographing direction (photographing such as scenery or the like) can be performed.

Here, when photographing is performed in a selfie photographing direction, i.e., the second photographing direction, the reflection unit 410 is moved in the direction of the light-receiving unit and in a direction perpendicular to the first photographing direction. As a result of moving the reflection unit 410, the second prism 412 between the first prism 411 and the second prism 412 is placed in a location corresponding to the light-receiving unit 120, as illustrated in FIG. 12. Thus, light incident from the side located in the second photographing direction may be reflected by the second prism 412, may proceed in the direction of the light-receiving unit and may be incident onto the light-receiving unit 120. As a result, photographing in the second photographing direction (selfie photographing) can be performed.

In this way, in the camera module according to Embodiment 3, the reflection unit 410 undergoes parallel translation in the direction of the light-receiving unit and in a direction perpendicular to the first photographing direction so that light incident from a side located in one direction of the first photographing direction and the second photographing direction can be selectively reflected in the direction of the light-receiving unit. Since a shape change due to parallel movement of the reflection unit does not affect a thickness direction of the camera module, elements for realizing bi-directional photographing including general photographing, which includes photographing scenery or the like, and selfie photographing can be embedded in the electronic device with a slim shape.

Figure 15:
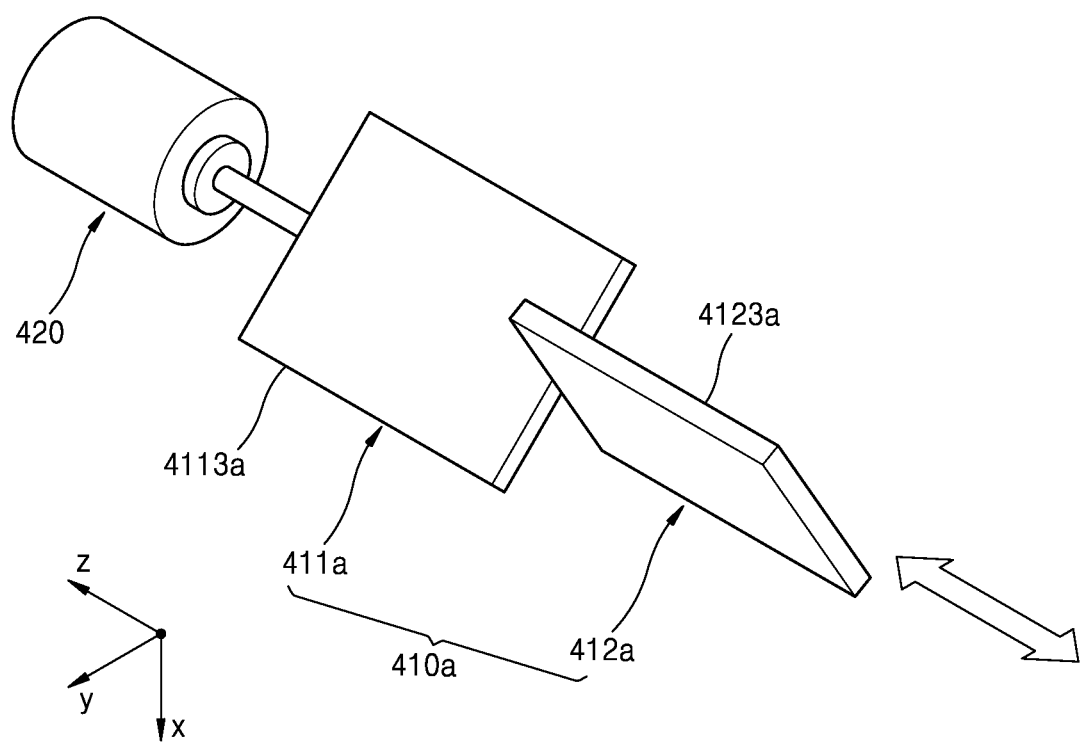
FIG. 15 is a perspective view of one example of a configuration of a camera module according to Embodiment 5 of the present disclosure.

Further, the present disclosure is not limited to the above embodiments and may be properly modified within a scope of the purpose of the present disclosure. For example, in the above embodiments, the reflection unit 110 is configured of a prism. However, the reflection unit may be a mirror that reflects light on both surfaces including a surface and a back side. For example, the reflection unit 110, 310, or 410 may be a mirror having a first reflection surface 1113, 3113, or 4113 on which light incident from the side located in the first photographing direction is reflected in the light-receiving unit, and a second reflection surface 1123, 3123, or 4123 on which light incident from the side located in the second photographing direction is reflected in the light-receiving unit. In an example, as illustrated in FIG. 14, a reflection unit 110a may be a mirror in which a second reflection surface 1123a is placed in an opposite direction to the first reflection surface 1113a. The first and second reflection surfaces 1113a and 1123a have an inclination of 45° with respect to the direction of the light-receiving unit and the first photographing direction, and a mirror is rotated around the rotation axis A that is a direction parallel to the first photographing direction. In another example, as illustrated in FIG. 15, a reflection unit 410a has a first reflection mirror 411a having a first reflection surface 4113a and a second reflection mirror 412a having a second reflection surface 4123a. The first reflection mirror 411a and the second reflection mirror 412a may be arranged along a movement direction of the reflection unit 410a, and the first reflection surface 4113a and the second reflection surface 4123a may be orthogonal to each other. In this way, the reflection units 110a and 410a are configured of mirrors so that aberration can be suppressed.

Further, a combination of prisms according to Embodiment 3 may be a combination of prisms having different refraction characteristics, as in Embodiment 2.

For the purposes of promoting an understanding of the principles of the present disclosure, reference has been made to the preferred embodiments illustrated in the drawings, and specific language has been used to describe these embodiments. However, no limitation of the scope of the present disclosure is intended by this specific language, and the present disclosure should be construed to encompass all embodiments that would normally occur to one of ordinary skill in the art.

The particular implementations shown and described herein are illustrative examples of the present disclosure and are not intended to otherwise limit the scope of the present disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical". Expressions such as "including" and "having" used herein are used to be understood as terms for open-type closing of description.

The use of any and all examples, or exemplary language (e.g., "such as") provided herein, is intended merely to better illuminate the present disclosure and does not pose a limitation on the scope of the present disclosure unless otherwise claimed. Numerous modifications and adaptations will be readily apparent to those of skill in the art without departing from the spirit and scope of the present disclosure.

EXPLANATION OF REFERENCE NUMERALS 100, 400 camera module
110 reflection unit
111, 112, 311, 312, 411, 412 prism
113, 134, 135 gear
120 light-receiving unit
121 image stabilization unit
122 focusing unit
123 mirror
124 light-receiving element
130 rotation unit
131 motor
132 worm
135 worm wheel
200 electronic device
410 reflection unit
420 parallel movement unit
421 actuator
422 shaft

The invention claimed is:

1. A camera module capable of selectively capturing an image in a first photographing direction or in a second photographing direction opposite to the first photographing direction, the camera module comprising:
   a reflection unit that is movable between a first location, at which first light incident from a side located in the first photographing direction is reflected in a direction perpendicular to the first photographing direction, and a second location, at which second light incident from a side located in the second photographing direction is reflected in the direction perpendicular to the first photographing direction; and
   a light-receiving unit configured to capture the image by converting the first light and the second light, which has been reflected by the reflection unit, into an electrical signal,
   wherein, during movement of the reflection unit, a thickness of the reflection unit is constantly maintained in the first photographing direction of the reflection unit,
   wherein the reflection unit is rotated around a rotation axis that is parallel to the first photographing direction and is moved, and
   wherein the reflection unit comprises:
      a first prism including a first incidence surface facing in the first photographing direction, a first exit surface facing in a direction perpendicular to the first photographing direction, and a first reflection surface on which light incident through the first incidence surface is reflected facing toward the first exit surface; and
      a second prism including a second incidence surface facing in the second photographing direction, a second exit surface facing in a direction perpendicular to the second photographing direction, and a second reflection surface on which light incident through the second incidence surface is reflected facing toward the second exit surface.

2. The camera module of claim 1, wherein the first reflection surface and the second reflection surface are in contact with each other, and the first incidence surface and the second incidence surface are placed to face in opposite directions, and the first exit surface and the second exit surface are placed to face in opposite directions.

3. The camera module of claim 2, wherein the reflection unit is rotated around the rotation axis and has a first rotation location at which the first exit surface faces the light-receiving unit and a second rotation location at which the second exit surface faces the light-receiving unit, and when the reflection unit is placed at the first rotation location, the first light is incident from the side located in the first photographing direction and is transmitted to the light-receiving unit by the first prism, and when the reflection unit is placed at the second rotation location, the second light is incident from the side located in the second photographing direction and is transmitted to the light-receiving unit by the second prism.

4. The camera module of claim 3, further comprising a magnet placed in the reflection unit and a Hall sensor configured to detect a location of the magnet so that a rotation location of the reflection unit is detected.

5. The camera module of claim 1, wherein the first prism and the second prism have different refraction characteristics.

6. The camera module of claim 1, wherein the reflection unit undergoes parallel translation in a direction perpendicular to both the first photographing direction and the reflection direction.

7. The camera module of claim 6, wherein the first prism and the second prism are arranged along a movement direction of the reflection unit, the first reflection surface and the second reflection surface are orthogonal to each other, the first incidence surface and the second incidence surface are placed to face in opposite directions, and the first exit surface and the second exit surface are placed to face in a same direction.

8. An electronic device comprising the camera module of claim 1, the electronic device being capable of selectively capturing the image in the first photographing direction or in the second photographing direction opposite to the first photographing direction.

9. The electronic device of claim 8, wherein the reflection unit is rotated around a rotation axis that is parallel to the first photographing direction and is moved.

10. The electronic device of claim 8, wherein the first reflection surface and the second reflection surface are in contact with each other, and the first incidence surface and the second incidence surface are placed to face in opposite directions, and the first exit surface and the second exit surface are placed to face in opposite directions.

11. The electronic device of claim 8, wherein the reflection unit is rotated around the rotation axis and has a first rotation location at which the first exit surface faces the light-receiving unit and a second rotation location at which the second exit surface faces the light-receiving unit, and when the reflection unit is placed at the first rotation location, the first light is incident from the side located in the first photographing direction and is transmitted to the light-receiving unit by the first prism, and when the reflection unit is placed at the second rotation location, the second light is incident from the side located in the second photographing direction and is transmitted to the light-receiving unit by the second prism.

12. The electronic device of claim 11, further comprising a magnet placed in the reflection unit and a Hall sensor configured to detect a location of the magnet so that a rotation location of the reflection unit is detected.

* * * * *